(12) United States Patent
Ichieda et al.

(10) Patent No.: US 9,961,318 B2
(45) Date of Patent: May 1, 2018

(54) PROJECTOR

(71) Applicant: Seiko Epson Corporation, Tokyo (JP)

(72) Inventors: Hiroyuki Ichieda, Matsumoto-shi (JP); Kenichi Asami, Azumino (JP); Kanji Yoshida, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/393,578

(22) Filed: Dec. 29, 2016

(65) Prior Publication Data

US 2017/0208307 A1 Jul. 20, 2017

(30) Foreign Application Priority Data

Jan. 20, 2016 (JP) ................. 2016-008573
Oct. 6, 2016 (JP) ................. 2016-197830

(51) Int. Cl.
| | | |
|---|---|---|
| *G03B 21/14* | (2006.01) | |
| *H04N 9/31* | (2006.01) | |
| *H04N 7/18* | (2006.01) | |
| *H04N 5/232* | (2006.01) | |
| *G02B 7/14* | (2006.01) | |
| *G02B 13/16* | (2006.01) | |
| *G02B 15/14* | (2006.01) | |
| *H04N 5/247* | (2006.01) | |

(52) U.S. Cl.
CPC ............ *H04N 9/3194* (2013.01); *G02B 7/14* (2013.01); *G02B 13/16* (2013.01); *G02B 15/14* (2013.01); *H04N 5/23238* (2013.01); *H04N 5/247* (2013.01); *H04N 7/181* (2013.01); *H04N 9/3182* (2013.01); *H04N 9/3185* (2013.01); *G03B 21/147* (2013.01)

(58) Field of Classification Search
CPC .. G03B 21/147; G03B 21/142; H04N 9/3185; H04N 9/3188; H04N 9/3194
USPC ..................................... 353/69, 70
See application file for complete search history.

(56) References Cited

U.S. PATENT DOCUMENTS

| | | | | |
|---|---|---|---|---|
| 9,299,321 | B2 | 3/2016 | Ohno | |
| 2005/0179875 | A1* | 8/2005 | Aoyanagi | G03B 5/02 353/101 |
| 2010/0225746 | A1* | 9/2010 | Shpunt | G01B 11/2518 348/50 |
| 2014/0293243 | A1 | 10/2014 | Furui | |

FOREIGN PATENT DOCUMENTS

| | | |
|---|---|---|
| JP | 2014-197739 A | 10/2014 |
| JP | 2015-167341 A | 9/2015 |

\* cited by examiner

*Primary Examiner* — Ryan Howard
(74) *Attorney, Agent, or Firm* — ALG Intellectual Property, LLC (57) ABSTRACT

A projector includes a projection lens, a first imaging section adapted to take an image of the projection surface, and a second imaging section adapted to take an image of the projection surface with a field angle wider than a field angle of the first imaging section. The first imaging section is disposed at a first distance from an optical axis of the projection lens in a direction perpendicular to the optical axis, and the second imaging section is disposed at a second distance longer than the first distance from the optical axis of the projection lens in the direction perpendicular to the optical axis.

6 Claims, 5 Drawing Sheets

PROJECTOR

The entire disclosure of Japanese Patent Application Nos. 2016-008573, filed Jan. 20, 2016 and 2016-197830, filed Oct. 6, 2016 are expressly incorporated by reference herein.

BACKGROUND

1. Technical Field

The present invention relates to a projector.

2. Related Art

There has been known a system, which shoots the projection state of a projector with a built-in camera to measure the projection color, the projection position, and so on, and then automatically performs an appropriate correction (JP-A-2015-167341, JP-A-2014-197739).

Incidentally, in general, a projection distance of a projector is variously set depending on a usage of the projector in some cases. The built-in camera is required to be able to take an image of the state of a screen (a projection surface) irrespective of the projection distance of the projector. However, conventionally, in an actual condition, an appropriate configuration and an appropriate configuration taking the projection distance into consideration have not been sufficiently devised with respect to the built-in camera.

SUMMARY

An advantage of some aspects of the invention is to solve at least a part of the problems described above, and the invention can be implemented as the following forms or application examples.

(1) According to an aspect of the invention, a projector adapted to project an image on a projection surface is provided. The projector includes a projection lens, a first imaging section adapted to take an image of the projection surface, and a second imaging section adapted to take an image of the projection surface with a field angle wider than a field angle of the first imaging section. The first imaging section is disposed at a first distance from an optical axis of the projection lens in a direction perpendicular to the optical axis, and the second imaging section is disposed at a second distance longer than the first distance from the optical axis of the projection lens in the direction perpendicular to the optical axis.

According to this projector, since the second imaging section adapted to take an image of the projection surface with a wider field angle is disposed at a position further from the optical axis of the projection lens, it is possible to prevent the wide field angle of the second imaging section and the outer shape of the projection lens from interfering with each other.

(2) The projector described above may further include a lens mount on which a first projection lens for long-range projection and a second projection lens for short-range projection in an exchangeable manner, a lens information acquisition section adapted to obtain projection lens identification information used for identifying a projection lens mounted on the lens mount, and a control section, in which the control section may make the first imaging section take the image of the projection surface in a case in which the projection lens identification information indicates that the first projection lens is mounted on the lens mount, and make the second imaging section take the image of the projection surface in a case in which the projection lens identification information indicates that the second projection lens is mounted on the lens mount.

According to this configuration, it is possible to make the appropriate imaging section perform imaging in accordance with the projection lens presently mounted.

(3) In the projector described above, the projection lens may be a zoom lens having a variable focal distance, and the projector may further includes a lens information acquisition section adapted to obtain zoom information representing the focal distance of the projection lens, and a control section, in which the control section may make the first imaging section take the image of the projection surface in a case in which the zoom information indicates that the focal distance is no shorter than a predetermined threshold value, and make the second imaging section take the image of the projection surface in a case in which the zoom information indicates that the focal distance is shorter than the predetermined threshold value.

According to this configuration, it is possible to make the appropriate imaging section perform imaging in accordance with the focal distance of the projection lens.

(4) In the projector described above, the first imaging section and the second imaging section may have respective appearances different from each other.

According to this configuration, in the case in which a failure has occurred in either of the first imaging section and the second imaging section, it is possible for the user of the projector to accurately determine which one of the first imaging section and the second imaging section the failure has occurred in.

(5) The projector described above may further include an adjustment section adapted to adjust a projection image to be projected on the projection surface based on a taken image taken by the first imaging section and the second imaging section.

According to this configuration, it is possible to appropriately adjust the projection image projected on the projection surface based on the taken image taken by the first imaging section or the second imaging section.

The invention can be implemented with a variety of configurations such as a projector, a method of controlling the projector, a computer program for realizing the functions of the projector and the method, or a non-transitory storage medium storing the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Configuration of Projection Lens and Built-in Camera of Projector

Figure 1:
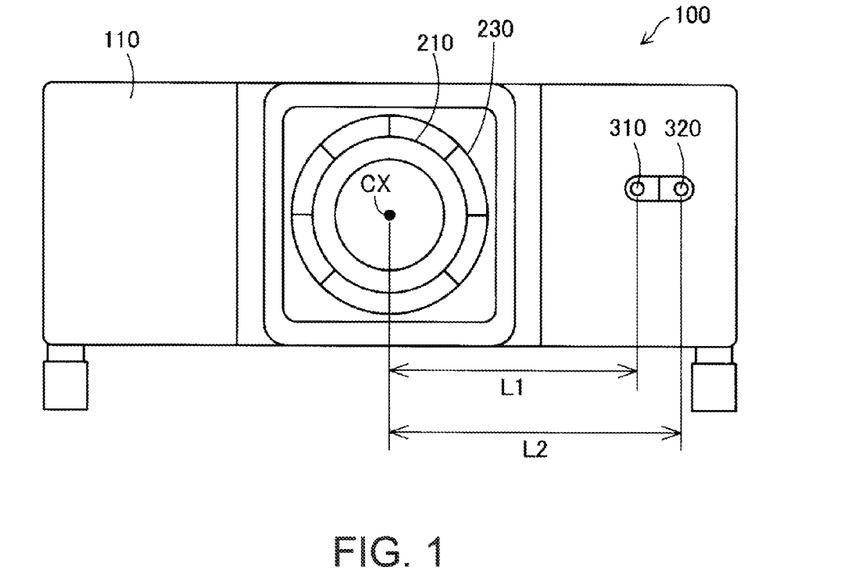
FIG. 1 is a front view showing the state in which a projection lens for long-range projection is attached to a projector.
Figure 2:
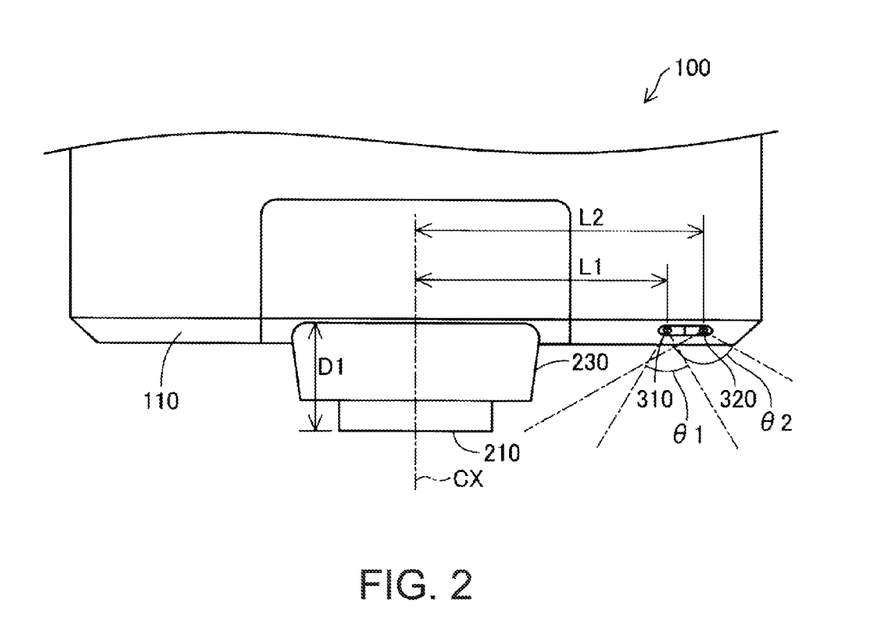
FIG. 2 is a perspective view of FIG. 1 viewed from above.

FIG. 1 is a front view showing the state in which a first projection lens 210 for long-range projection is attached to a projector 100, and FIG. 2 is a perspective view of the state viewed from above. On a front panel 110 of the projector 100, there are disposed the first projection lens 210, and two built-in cameras 310, 320 for taking an image projected on the projection surface. The first projection lens 210 is mounted on a lens mount 230 in an exchangeable manner. As shown in FIG. 2, a lens tube of the first projection lens 210 is projected from the front panel 110 as much as a projection amount D1.

The first camera 310 is a first imaging section for long-range shooting, and the second camera 320 is a second imaging section for short-range shooting. It is preferable for these cameras 310, 320 to have one or more differences out of the following differences 1 through 3, and the difference 1 described below is the most typical difference.

1. The field angle θ2 (FIG. 2) of the second camera 320 for short-range shooting is wider than the field angle θ1 of the first camera 310 for long-range shooting.
2. The focal position of the second camera 320 for short-range shooting is nearer than the focal position of the first camera 310 for long-range shooting.
3. The resolution of the second camera 320 for short-range shooting is lower than the resolution of the first camera 310 for long-range shooting.

The first camera 310 for long-range shooting is disposed at a position distant as much as a first distance L1 in a direction perpendicular to the optical axis CX of the first projection lens 210 with reference to the optical axis CX. The second camera 320 for short-range shooting is disposed at a position distant as much as a second distance L2 longer than the first distance L1 in the direction perpendicular to the optical axis CX of the first projection lens 210 with reference to the optical axis CX. The reason therefor will be described later.

Figure 3:
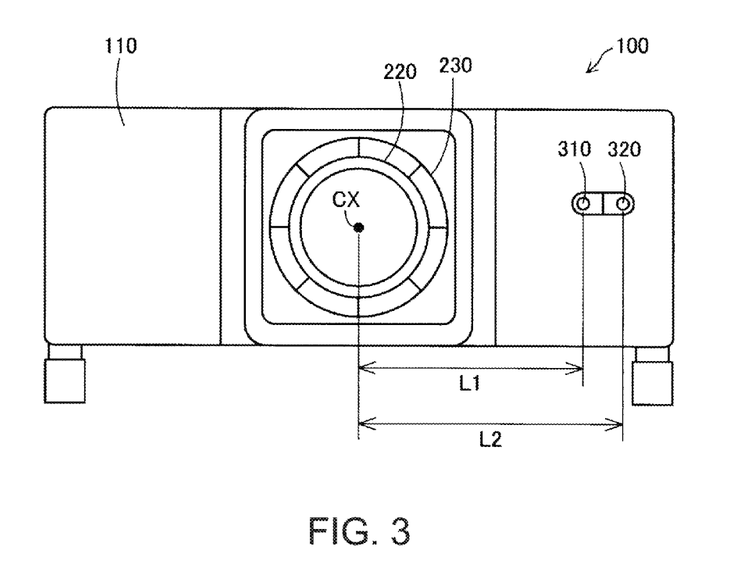
FIG. 3 is a front view showing the state in which a projection lens for short-range projection is attached to the projector.
Figure 4:
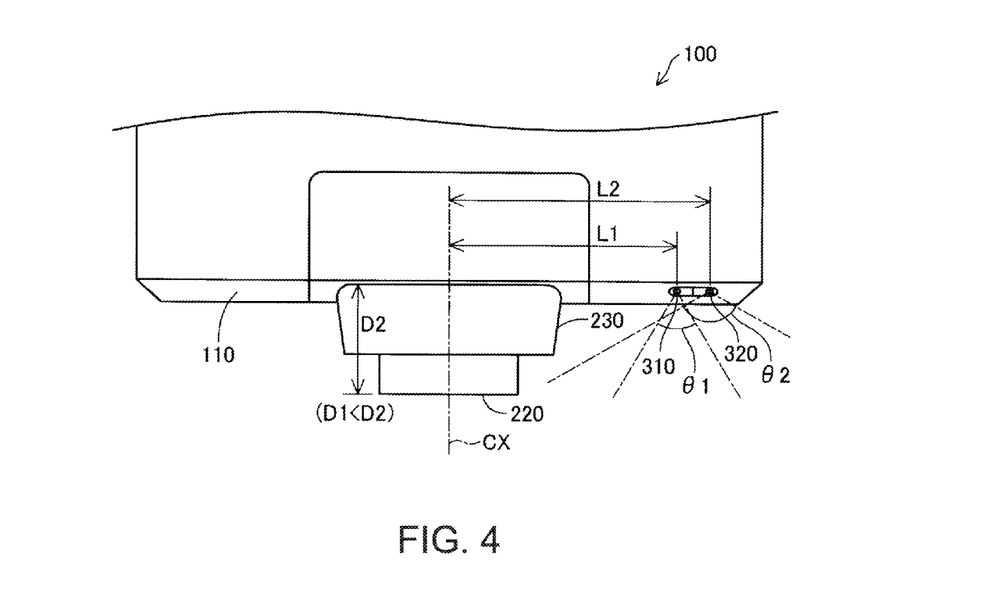
FIG. 4 is a perspective view of FIG. 3 viewed from above.

FIG. 3 is a front view showing the state in which a second projection lens 220 for short-range projection is attached to the projector 100, and FIG. 4 is a perspective view of the state viewed from above. As shown in FIG. 4, a lens tube of the second projection lens 220 is projected from the front panel 110 as much as a projection amount D2. In a typical example, the projection amount D2 of the second projection lens for short-range projection is larger than the projection amount D1 (FIG. 2) of the first projection lens 210 for long-range projection. The reason therefor is that the second projection lens 220 for projecting an image in a shorter distance becomes larger in lens aperture than the first projection lens 210, and thus the lens tube also tends to become longer, accordingly.

As described above, the second camera 320 for short-range shooting is disposed at the position further from the projection lenses 210, 220 than that of the first camera 310 for long-range shooting. The reason therefor is that in general, the second camera 320 for short-range shooting is wider in field angle than the first camera 310 for long-range shooting, and therefore, if the second camera 320 is disposed at a position close to the projection lens 220, the lens tube of the projection lens 220 enters the field angle of the second camera 320, and there is a possibility that the whole of the projection image on the screen surface cannot be shot. Further, even in the case in which the whole of the projection image on the screen surface can be shot, if the lens tube of the projection lens 220 is located in the field angle of the second camera 320, there is a possibility that the outside light is reflected by the lens tube of the projection lens 220, and the reflected light enters the second camera 320 to cause significant noise in the taken image. The possibility of occurrence of these problems becomes higher in the case in which the projection amount D2 of the second projection lens 220 for short-range projection is larger than the projection amount D1 (FIG. 2) of the first projection lens 210 for long-range projection, or in the case in which the aperture of the second projection lens 220 is larger than the aperture of the first projection lens 210. Therefore, in order to keep the influence described above to a minimum within the limited space of the front panel 110 of the projector 100 taking the design into consideration, the second camera 320 for short-range shooting is disposed at the position further from the optical axis CX of the projection lenses 210, 220 compared to the first camera 310 for long-range shooting.

It should be noted that in the case in which the distance (the projection distance) between the projector 100 and the projection surface is changed, the further from the optical axis CX of the projection lenses 210, 220 the cameras 310, 320 are disposed, the larger the change in position of the projection image in the taken image becomes. However, the second camera 320 disposed distant from the optical axis CX of the projection lenses 210, 220 compared to the first camera 310 is wider in field angle than the first camera 310, and can therefore include the projection image in the field angle even if the position of the projection image in the taken image changes.

It should be noted that as an arrangement positional relationship between the cameras 310, 320, it is possible to adopt a configuration in which the cameras 310, 320 are arranged in a lateral direction (a horizontal direction) as in the example shown in FIG. 1 through FIG. 4, or a configuration in which the cameras 310, 320 are arranged at arbitrary positions such as concentric positions centered on the optical axis CX of the projection lenses 210, 220. It should be noted that in the case of providing three or more cameras to the projector, it is also possible to disposed them in sequence so that the wider the field angle, the further from the optical axis CX of the projection lenses 210, 220 the position at which the camera is disposed is located.

It should be noted that in the case in which the lens tube of any of the projection lenses 210, 220 is included in the field angle of any of the cameras 310, 320, it is preferable to manufacture the lens tube of the projection lenses 210, 220 with a material (e.g., a diffuse reflective material with microscopic protrusions or recesses) low in reflectivity.

Further, it is preferable for the cameras 310, 320 to be disposed at higher positions than the optical axis CX of the projection lenses 210, 220. The reason therefore is that in the case of using the projector 100 mounted on a desk or the like, if the cameras 310, 320 are disposed on the lower side, the desk or the like is included in the field angle of the cameras 310, 320, and there is a possibility that it is unachievable to shoot the whole of the projection image on the screen surface. Further, even in the case in which the whole of the projection image can be shot, if the desk or the like is located in the field angle of any of the cameras 310, 320, there is a possibility that the outside light is reflected by the desk or the like, and the reflected light enters any of the cameras 310, 320 to cause significant noise in the taken image. In particular, since the wider the field angle is as in the case of the second camera 320, the higher the possibility of the occurrence of such a problem is, it is also possible to dispose the second camera at a position higher than the position of the first camera 310.

Figure 5:
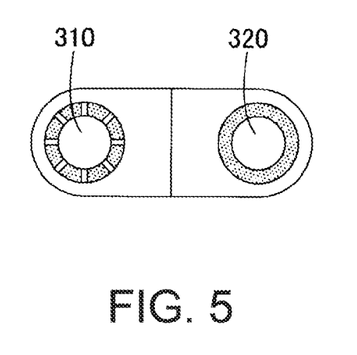
FIG. 5 is a diagram showing an example of an appearance of a first camera and a second camera.
Figure 6:
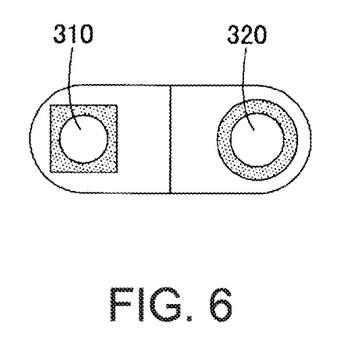
FIG. 6 is a diagram showing another example of the appearance of the first camera and the second camera.
Figure 7:
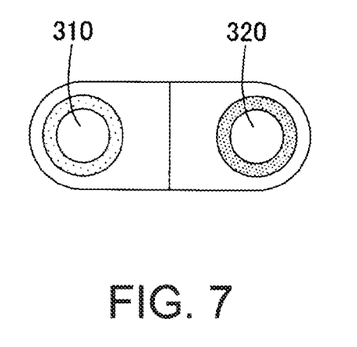
FIG. 7 is a diagram showing still another example of the appearance of the first camera and the second camera.

FIG. 5, FIG. 6, and FIG. 7 are diagrams showing a variety of examples of the appearance of the first camera 310 and the second camera 320. In these examples, the appearance of each of the first camera 310 for long-range shooting and the second camera 320 for short-range shooting is made easy to recognize with the human eyes. According to the above, in the case in which a failure occurs in either of the cameras 310, 320, it is possible for a user of the projector 100 to correctly determine which of the cameras the failure has occurred in, and to smoothly make an inquiry to a support center. Further, it is also possible to arrange that in the case in which a failure has occurred in one of the cameras, a message for prompting the exchange of the camera is displayed, and at the same time, appearance features of the camera as the exchange object are shown with words, pictures, and so on. Further, it is also possible to arrange that by showing the appearance features of the camera in use with words, pictures, and so on in a menu window or the like, it is possible for the user to recognize what camera is presently used.

B. Functional Blocks of Projector According to First Embodiment

Figure 8:
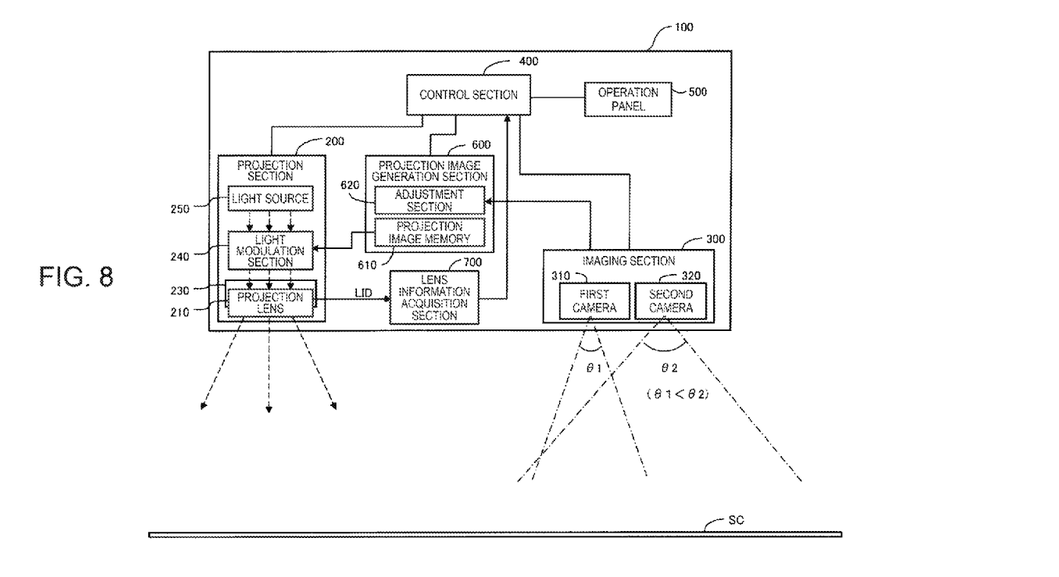
FIG. 8 is a functional block diagram of a projector according to a first embodiment.

FIG. 8 is a functional block diagram of the projector according to the first embodiment. The projector 100 has a control section 400, an operation panel 500, a projection section 200, a projection image generation section 600, a lens information acquisition section 700, and an imaging section 300. The imaging section 300 has the first camera 310 for long-range shooting, and the second camera 320 for short-range shooting described above.

The control section 400 performs control of each of the sections incorporated in the projector 100. Further, the control section 400 has a function of making either of the first camera 310 and the second camera 320 take an image of the projection surface SC (the screen surface) in accordance with the information obtained by the lens information acquisition section 700.

The projection image generation section 600 has a function of generating a projection image to be projected by the projection section 200 on the projection surface SC, and has a projection image memory 610 for storing the projection image, and an adjustment section 620 for adjusting the projection image.

The adjustment section 620 performs an adjustment process of the projection image to be projected on the projection surface SC based on the taken image taken by the first camera 310 or the second camera 320. It is preferable for the adjustment process to include, for example, a keystone correction for correcting keystone distortion of the projection image, or a color correction of the projection image. In the case of performing the color correction of the projection image, a measurement pattern for measuring the color of the projection light from the projection section 200 is projected, then the projection color is measured using the first camera 310 or the second camera, and then the color of the projection light is corrected. Specifically, there are calculated a gain value for adjusting the balance between red, green, and blue in the plurality of grayscale levels, a correction amount of the luminance for correcting the gamma characteristic, correction data at each point for correcting a color variation in a plane, and so on. Further, the adjustment section 620 performs the correction using these correction values so that the projection light of the projector 100 has a desired color tone.

The projection section 200 has a function of projecting the projection image, which has been generated by the projection image generation section 600, on the projection surface SC. The projection section 200 has a light modulation section 240 and a light source 250 besides the projection lens 210 and the lens mount 230 described with reference to FIG. 1. The light modulation section 240 modulates the light from the light source 250 in accordance with the projection image data supplied from the projection image memory 610 to thereby form projection image light. The projection image light is typically color image light including the visible light of three colors of RGB, and is projected by the projection lens 210 on the projection surface SC. It should be noted that as the light source 250, there can be adopted a variety of types of light sources such as a light emitting diode or a laser diode besides a light source lamp such as a super-high pressure mercury lamp. Further, as the light modulation section 240, there can be adopted a transmissive or reflective liquid crystal panel, a digital mirror device, and so on, and there can also be adopted a configuration provided with a plurality of light modulation sections 240 for the respective colored light beams.

The lens information acquisition section 700 obtains projection lens identification information for identifying the projection lens 210 (or 220) mounted on the lens mount 230. In the example shown in FIG. 8, physical or electrical discriminant bits are disposed in a connection part between the lens mount 230 and the projection lens 210 (or 220), and a lens identification signal LID representing the value of the discriminant bits is supplied from the lens mount 230 to the lens information acquisition section 700. It is possible for the lens information acquisition section 700 to obtain the projection lens identification information for identifying the projection lens 210 (or 220) presently mounted, and then supply the control section 400 with the projection lens identification information. The control section 400 judges which one of the two projection lenses 210, 220 is mounted on the lens mount 230 in accordance with the projection lens identification information. In the case in which the first projection lens 210 is mounted on the lens mount 230, the control section 400 makes the first camera 310 take the image of the projection surface SC. In contrast, in the case in which the second projection lens 220 is mounted on the lens mount 230, the control section 400 makes the second camera 320 take the image of the projection surface SC. According to the above, it is possible to select an appropriate camera out of the cameras 310, 320 in accordance with the projection lens mounted presently, and then make the camera thus selected perform imaging.

It should be noted that it is also possible for the lens information acquisition section 700 to obtain the projection lens identification information for identifying the projection lens 210 (or 220) mounted presently in accordance with an instruction of a user using the operation panel 500 or a remote controller (not shown) instead of receiving the lens identification signal LID from the lens mount 230.

C. Functional Blocks of Projector According to Second Embodiment

Figure 9:
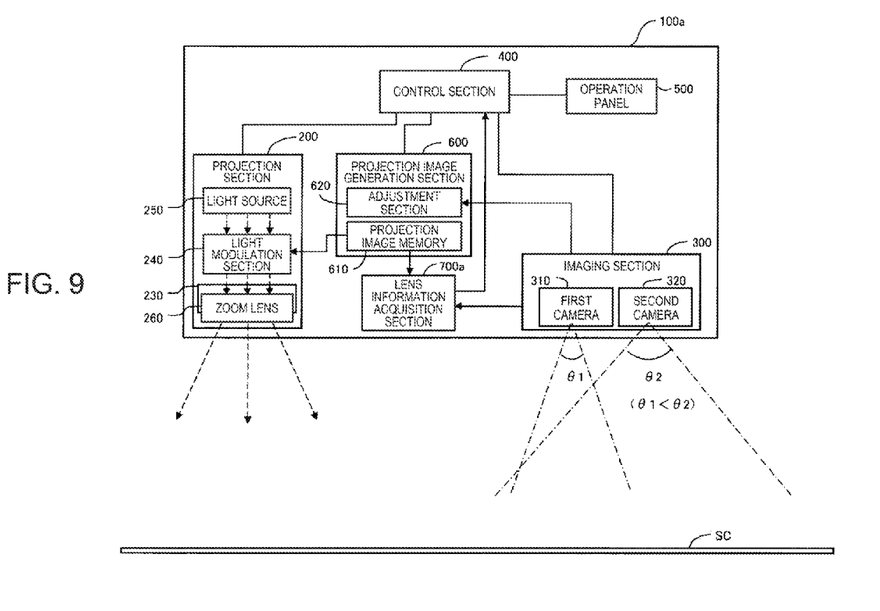
FIG. 9 is a functional block diagram of a projector according to a second embodiment.

FIG. 9 is a functional block diagram of the projector according to a second embodiment. The second embodiment is different from the first embodiment shown in FIG. 8 in two points, namely the point that a zoom lens 260 capable of changing the focal distance (the field angle) is used instead of the exchangeable projection lens 210, and the point that the lens information acquisition section 700a obtains zoom information representing the focal distance of the zoom lens 260, and the other configuration are substantially the same as those of the first embodiment.

The lens information acquisition section 700a obtains the zoom information representing the focal distance of the zoom lens 260. Specifically, for example, a sensor capable of detecting the zoom position of the zoom lens 260 is attached to the zoom lens 260 in advance, and then the zoom information is obtained based on the zoom position thus detected. In the case in which the zoom information indicates that the focal distance is equal to or longer than a predetermined threshold value, the control section 400 makes the first camera 310 take the image of the projection surface SC. In contrast, in the case in which the zoom information indicates that the focal distance is shorter than the threshold value, the control section 400 makes the second camera 320 take the image of the projection surface SC. According to the above, it is possible to select a more appropriate camera out of the cameras 310, 320 in accordance with the actual focal distance, and then make the camera thus selected perform imaging.

It should be noted that it is also possible to arrange that the lens information acquisition section 700a obtains the zoom information using a method other than the detection of the zoom position with the sensor described above. For example, it is also possible to project an image including a predetermined pattern on the projection surface SC, then take the image with the wide-angle second camera 320, and then derive the zoom information based on the position and the size of the pattern in the taken image.

Further, it is sufficient for the zoom information to be the information substituted for the focal distance, and the zoom information is not limited to the information directly representing the focal distance itself. For example, the information representing a zoom ratio and the information representing the field angle are included in the "zoom information representing the focal distance." In other words, it is sufficient for the zoom information to be the information representing the zoom condition of the zoom lens 260.

It should be noted that even in the configuration in which the zoom lens 260 is exchangeable as in the first embodiment, by changing the threshold value in accordance with the zoom lens mounted, it becomes possible to select an appropriate camera in accordance with the zoom lens mounted and the focal distance, and then make the camera thus selected perform imaging. On this occasion, the lens information acquisition section 700a obtains the projection lens identification information and the zoom information, and the control section 400 selects an appropriate camera based on the information.

It should be noted that the invention is not limited to the specific examples or the embodiments described above, but can be implemented in a variety of forms within the scope or the spirits of the invention.

For example, the invention is not limited to the configuration in which the focal distance is directly compared with the threshold value when selecting the camera based on the zoom information, but it is also possible to arrange that a table having a plurality of pieces of zoom information associated with the cameras in accordance with the comparison result with the threshold value is stored in advance in a storage section not shown, and then the camera is selected based on the zoom information obtained and the table.

Further, it is also possible to arrange that, for example, in the configuration of selecting the camera based on the zoom information, the size (an imaged projection size) of the projection image in the taken image of the wide-angle second camera 320 is stored in advance in the storage section in the case of setting the zoom lens 260 to the tele end, and in the case of setting the zoom lens 260 to the wide end, the control section 400 performs proportional interpolation on the two imaged projection sizes in accordance with the zoom information obtained to thereby estimate the actual imaged projection size, and then selects the camera based on the imaged projection size thus estimated.

Further, it is also possible to shoot the projection surface, on which a predetermined image (e.g., a solid white image) is projected, using the wide-angle second camera 320 to detect the position and the size of the projection image in the taken image, and then select the camera in accordance with the position and the size of the projection image thus detected.

Further, it is also possible to adopt a configuration in which the lens information acquisition sections 700, 700a also obtain projection distance information representing the distance (the projection distance) between the projector 100 and the projection surface SC. In this case, it is possible for the control section 400 to select the camera based on the projection distance information, or to change the threshold value for selecting the camera based on the projection distance information. It should be noted that in order to obtain the projection distance information, there can be used triangulation using the projection image stored in the projection image memory 610 and the taken image obtained by taking the projection image projected on the projection surface SC using the first camera 310 or the second camera 320. Further, it is also possible to attach a sensor capable of obtaining the focal position to the projection lens, and then calculate the projection distance based on the focal position, or to provide a distance sensor to thereby directly measure the projection distance.

Further, it is also possible to adopt a configuration of selecting the camera in accordance with the adjustment content performed by the adjustment section 620. For example, in the configuration in which a plurality of projectors projects images in an arranged manner, or the like, in the case in which the adjustment section 620 adjusts the own projection image based on the projection images of the other projectors, it is necessary to select the camera capable of taking the projection images of the other projectors together with the own projection image. In contrast, in the case in which the adjustment section 620 performs the adjustment based only on the own projection image, it is sufficient to select the camera capable of taking at least the own projection image. On this occasion, an adjustment information acquisition section not shown obtains the adjustment content, which has been designated by the user with the operation panel 500 or a remote controller, as adjustment information, and the control section 400 selects an appropriate camera based on the adjustment information. It should be noted that it is also possible to adopt a configuration of selecting the camera based on two pieces of information comprising the projection lens identification information and the adjustment information, two pieces of information comprising the zoom information and the adjustment information, or three pieces of information comprising the projection lens identification information, the zoom information, and the adjustment information.

What is claimed is:

1. A projector adapted to project an image on a projection surface, comprising:
  a projection lens;

a first imaging section adapted to take an image of the projection surface; and
a second imaging section adapted to take an image of the projection surface with a field angle wider than a field angle of the first imaging section,
wherein the first imaging section is disposed at a first distance from an optical axis of the projection lens in a direction perpendicular to the optical axis, and
the second imaging section is disposed at a second distance longer than the first distance from the optical axis of the projection lens in the direction perpendicular to the optical axis.

2. The projector according to claim 1, further comprising:
a lens mount on which a first projection lens for long-range projection and a second projection lens for short-range projection are mountable in an exchangeable manner;
a lens information acquisition section adapted to obtain projection lens identification information used for identifying a projection lens mounted on the lens mount; and
a control section,
wherein the control section
makes the first imaging section take the image of the projection surface in a case in which the projection lens identification information indicates that the first projection lens is mounted on the lens mount, and
makes the second imaging section take the image of the projection surface in a case in which the projection lens identification information indicates that the second projection lens is mounted on the lens mount.

3. The projector according to claim 1, wherein
the projection lens is a zoom lens having a variable focal distance, and
the projector further comprises:
a lens information acquisition section adapted to obtain zoom information representing the focal distance of the projection lens; and
a control section, and
the control section
makes the first imaging section take the image of the projection surface in a case in which the zoom information indicates that the focal distance is no shorter than a predetermined threshold value, and
makes the second imaging section take the image of the projection surface in a case in which the zoom information indicates that the focal distance is shorter than the predetermined threshold value.

4. The projector according to claim 1, wherein
the first imaging section and the second imaging section have respective appearances different from each other.

5. The projector according to claim 1, further comprising:
an adjustment section adapted to adjust a projection image to be projected on the projection surface based on a taken image taken by the first imaging section and the second imaging section.

6. The projector according to claim 1, further comprising:
a panel,
wherein the first imaging section and the second imaging section are mounted on the panel.

* * * * *